United States Patent [19]
Powell et al.

[11] 3,983,557
[45] Sept. 28, 1976

[54] DIGITAL DME WITH COMPENSATION FOR GROUND STATION INTERMITTENCIES

[75] Inventors: Ronald Lee Powell, King of Prussia; Frank Patterson Smith, II, Dresher, both of Pa.

[73] Assignee: Narco Scientific Industries, Inc., Fort Washington, Pa.

[22] Filed: Apr. 28, 1975

[21] Appl. No.: 571,844

[52] U.S. Cl. ................................................ 343/7.3
[51] Int. Cl.² .......................................... G01S 9/56
[58] Field of Search ..................................... 343/7.3

[56] References Cited
UNITED STATES PATENTS

| | | | |
|---|---|---|---|
| 3,478,355 | 11/1969 | Lundgreen et al. | 343/7.3 |
| 3,641,572 | 2/1972 | Lundgreen et al. | 343/7.3 |
| 3,781,888 | 12/1973 | Bail | 343/7.3 X |
| 3,889,260 | 6/1975 | Griffin | 343/7.3 |
| 3,900,848 | 8/1975 | Mears | 343/7.3 |

Primary Examiner—T.H. Tubbesing
Attorney, Agent, or Firm—Paul & Paul

[57] ABSTRACT

Each bin of a one-thousand stage shift register represents a two-tenth mile aircraft to ground station interval, and the register is shifted a full cycle corresponding to a two-hundred mile spacing. During a first shifting epic, all pulses returned from the ground station are inserted into the bins in timed relationship to each other and to transmitted pulses. In subsequent epics, stored pulses from the register are reinstated therein if there is time coincidence with another received signal. Once the register contains one-and-only-one signal, corresponding to the aircraft to station distance, that signal is automatically reinserted for the next three epics, regardless of signal receipt. Further coincidence of a receive signal, however, resets the automatic regeneration for three more periods, and so on. After three periods without a coincidence, all signals are passed to the register during the next epic.

10 Claims, 3 Drawing Figures

DIGITAL DME WITH COMPENSATION FOR GROUND STATION INTERMITTENCIES

BACKGROUND OF THE INVENTION

This invention relates to aircraft distance measuring equipment (DME), and more particularly to improvements in digital DME systems.

Conventionally, DME operation involves the transmission of a radio signal of specified character from an aircraft to a ground station. After specified delays and under known constraints at the ground station, a reply signal is radioed back to the aircraft. Once the return signal is identified, and known time delays are accounted for, the duration between transmission and reception is decoded to yield distance from the ground station to the aircraft. Many aircraft utilize the same ground stations at the same time, however, so the aircraft receiver must contain logic which speedily and reliably discriminates the response to its own transmitted signal from responses which are being sent out to other aircraft.

In U.S. Pat. No. 3,781,888 to John W. Bail, assigned to the assignee hereof, there is described a digital DME system in which this logical discrimination process is accomplished quickly and effectively utilizing digital logic techniques. In that patent, a one-thousand bit shift register has bins corresponding to two-tenth mile increments from the aircraft to the ground station. The register is clocked corresponding to passage of the transmitted and received radio waves through two-tenth mile increments. A full shifting cycle of such a register is referred to herein as an "epic". During a first epic, all received signals are inserted into the register in timed relationship with each other and with transmitted signals (i.e., "pass" mode), and during subsequent epics the number of signals in the register is reduced by reinstating only those which are coincident with further received signals (i.e., "recirculate" mode). When but a single bin of the register is filled, its time relationship is translated into distance between the aircraft and the ground station, to the nearest one-tenth mile.

The apparatus and methods set forth in that patent afford excellent DME ranging capabilities, with the identification of a return pulse being accomplished with great speed and accuracy. Its operation may occasionally be frustrated, however, by failure of the ground station, for any of a variety of reasons, to respond during a given epic. That is, since the identification and generation at the aircraft of the valid distance pulse depends on receipt of the decoded pulse, failure to receive such a pulse during an epic causes the pass and recirculate cycles to be re-executed even though the valid aircraft to station distance (within the degree of precision of the system) has not changed.

A ground station may fail to respond to DME ranging signals from an aircraft for a variety of reasons. When a particular signal is received by the ground station, all further signals within a prescribed time (typically 100 microseconds) are ignored in order to avoid responding to echoes of the same signal which it has just received. Hence, any other signal arriving during that time period simply will not be favored with a response. Further, the efficiency of a ground station response is directly dependent on the number of aircraft currently utilizing it. Normally, a response can be expected 70 percent of the time, but during high traffic periods, the reply efficiency of the ground station may even fall to 50 percent. During such time, the station has a built in preference for higher powered signals, thereby substantially impairing the response efficiency to the lower powered signals. Since lower power may result from the length of distance between the aircraft and the ground station, or simply because of the power capability of the aircraft system (DME systems for commercial airliners involve substantially more power than those for small or private planes), it would be useful for the aircraft to be able to account and compensate for reduced reply efficiency from the ground station.

It is accordingly a primary object of the present invention to provide apparatus and methods whereby digital DME systems such as set forth in the above captioned patent are reasonably protected from having their own ranging capabilities diminished due to reduced ground station reply efficiency.

SUMMARY OF THE INVENTION

The present invention is based on the proposition that once a valid distance pulse is identified, the probability is high for a specified subsequent time period that the true range between the aircraft and the ground station will not have changed, within the measurement precision of the DME system. For example, conventional DME systems operate to a degree of precision of 0.1 miles. The present invention, then, utilizes this precision to establish, upon failure of the aircraft to receive an expected return signal, a limited time duration during which the priorly determined valid distance shall be presumed to be accurate. If, during the specified duration, a valid distance pulse is again received, the same conditions obtain. On the other hand, if no valid return signal is received during the presumptive period, the active DME ranging process (i.e., pass and recirculate) is commenced.

The present invention involved reinstatement of a previously determined valid distance pulse into the register of a digital DME for a predetermined number of epics, advantageously three, even in the absence of a received coincidence pulse. If during those three epics, a return pulse from the ground system is received in timed coincidence with the regenerated valid distance pulse, the regeneration logic is reset, and again if no coincidence pulse is received, a three epic regeneration process will be undertaken. Whenever three such epics pass without receipt of a coincident pulse, the previous valid distance pulse is eliminated, and the pass and recirculating ranging process once more is undertaken.

In an illustrative embodiment, a one-thousand bit shift register is clocked to shift through an entire cycle corresponding to a two-hundred mile aircraft to station distance range. During a first epic, pass logic inserts all return pulses into the register. During subsequent epics, recirculate logic compares stored signals with further receive signals, and restores signals to the register only when time coincidence occurs. The process continues until only one signal pulse is stored in the register. Regeneration logic is thereby set, such that the single pulse automatically is restored into the register for three subsequent epics. Coincidence of a received pulse with the single stored pulse resets the regeneration logic to operate for three more epics.

DETAILED DESCRIPTION

Figure 1:
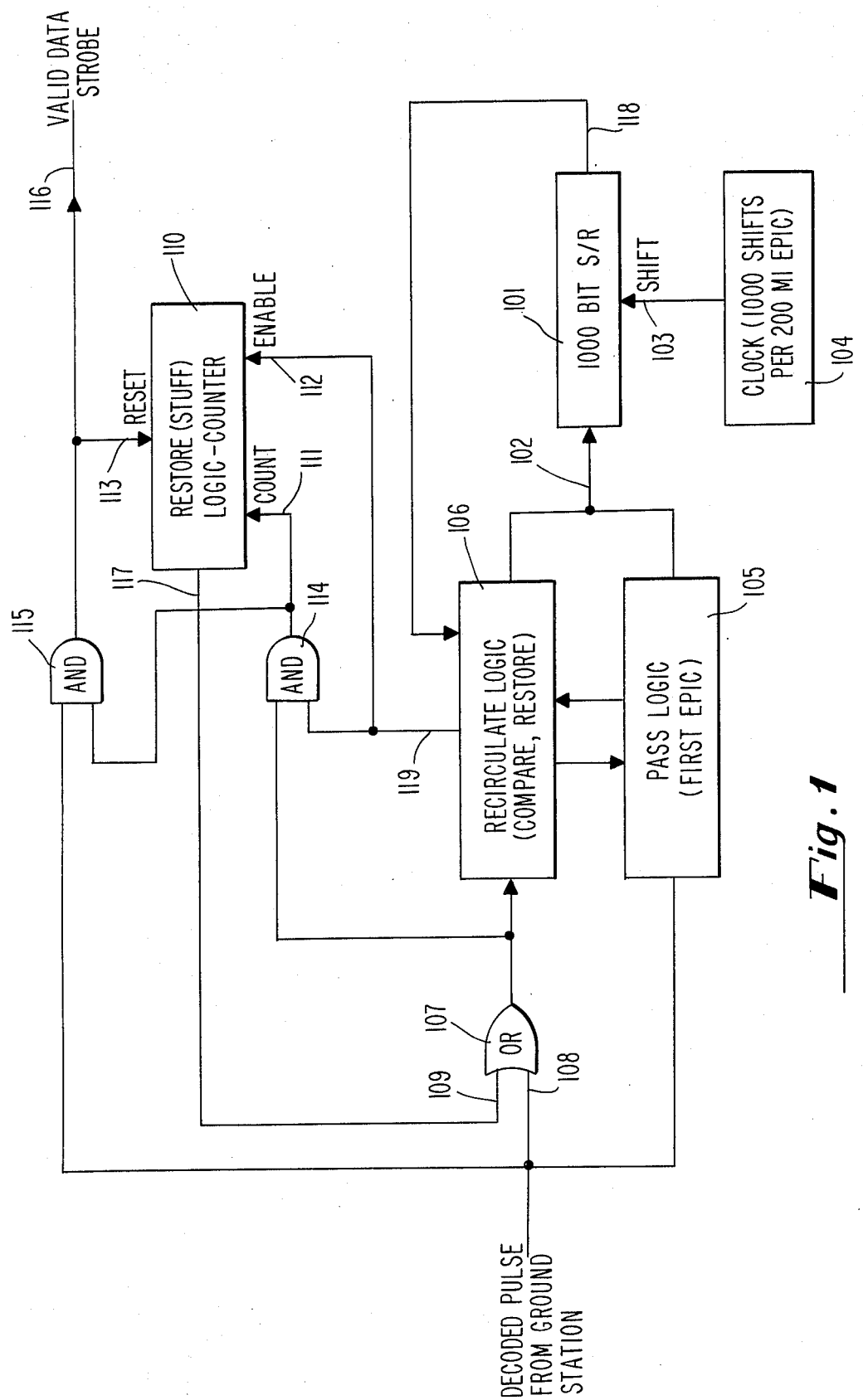
FIG. 1 shows in block diagram form an illustrative embodiment of the principles of the present invention.

Referring first to FIG. 1, there is shown a symbolized logic-block diagram embodiment of the principles of the present invention. Basically, the embodiment of FIG. 1 is cast in the form of the aforementioned U.S. Pat. No. 3,781,888 to John W. Bail, with further logic being added thereto for illustrating the principles of the present invention.

A memory means embodied as a one-thousand bit shift register 101 is shifted at control terminal 103 by pulses from a clock 104. Advantageously, pulses are coupled from the clock 104 to shift the register 101 at a periodicity of 2.4 microseconds (i.e., the time required for a radio signal to travel 0.2 nautical miles round trip) so that a full shifting cycle of the register 101 corresponds to a two-hundred mile aircraft to ground station range. Pulses are therefore coupled to the first bin of register 101 at terminal 102, are shifted through the one-thousand bins of the register 101, and subsequently are coupled to an output terminal 118.

The purpose of the FIG. 1 embodiment is to utilize passrecirculate logic in accordance with the referenced U.S. patent to Bail, and to arrive at a state where but a single decoded pulse from the ground station is stored in the shift register 101 in timed relationship to a corresponding previously transmitted pulse. Accordingly, during a first epic, decoded pulses from the ground station are coupled through pass logic 105 during a first epic directly to the one-thousand bit shift register 101. Like the clock pulses from clock 104, the decoded pulses from the ground station, if present, also conveniently involve a duration of 2.4 microseconds. Thus, as each decoded pulse from the ground station is passed to the register 101 by logic 105, bins are occupied based on time receipt by the aircraft relative to each other and to corresponding transmitted pulses. Hence, at the end of the first epic, a variable number of signals are stored in the register, and it becomes necessary to detect the one which is truly a response from the ground station to a signal previously transmitted by the aircraft. Of course, if the register is still empty at the end of the first epic, the pass logic is reactivated for the next epic, and so on, until at least one bit is stored in the register 101.

For the next subsequent epics, the pass logic 105 is disabled and recirculate logic 106 is enabled, such that decoded pulses from the ground station are passed via input terminal 108 of OR gate 107 to the recirculate logic, where the pulse is time compared with a signal from output terminal 118 of the last bin of register 101. If receipt of a decoded pulse from the ground station coincides with the shifting of a signal (i.e., a full bin) from the register 101, the recirculate logic 106 restores that pulse via terminal 102 to the first bin of register 101. If there is no time coincidence, no pulse is restored to the register. If no coincidence takes place, the pass mode is restored for the next epic, and pass logic 105 causes all decoded pulses once more to be loaded into the register 101. Otherwise, the recirculation mode continues until the number of coincidences are reduced to one, and a single signal is stored in register 101. The bin location of that signal thereby represents distance between the aircraft and the ground station.

The principles of the present invention come to play once the pass and recirculation steps successfully identify one-and-only-one signal within the register 101. Then, an output terminal 119 of the recirculate logic 106 is energized. In turn, restoration logic 110 is enabled at a terminal 112. The process involved in accordance with the principles of the present invention, and which is partially embodied by the logic 110 and further associated logic, alternatively is expressed herein as reinstatement of pulses, restoration of pulses, stuffing of pulses, and the like. Regardless of the particular term used, the function indicated is to cause the single pulse from the register 101 to be regenerated in the register 101 for the next three epics (or other suitable number).

The enablement of restore logic 110 sets a counter which is included therein, and which will serve to indicate the number of pulse stuffing epics caused by logic 110. Further, the enablement at terminals 112 causes an output terminal 117 of logic 110 to be fixed at a logical 1. For as long as the logical 1 state is maintained at terminal 117, it is coupled to the input of recirculated logic 106 via terminal 109 of OR gate 107, and thereby simulates coincidence of a decoded pulse with the single pulse from register 101 as it is coupled from output terminal 118 back to recirculate logic 106. Therefore, for as long as terminal 117 is held in the logical 1 state, a pulse exiting from register 101 will be reinstated in the first bin by logic 106, regardless of receipt of decoded pulses.

Each pulse which is so reinstated into register 101 causes a pulse to be transmitted via output terminal 119 of logic 106 ot an AND gate 114, the other input of which is responsive to the signal being coupled to the input of logic 106. Hence, each regeneration or "stuffing" of a pulse into register 101 enables AND gate 114, and transmits a count increment command to terminal 111 of the logic-counter 110. Advantageously, the counter of logic 110 is set to keep the logical 1 state at terminal 117 for three epics, and thus for three reinstatements of a pulse into the register 101. The signal which energizes a count via AND gate 114 also is coupled to another AND gate 115, the other terminal of which is supplied with decoded pulses from the ground station. Coincidence of the decoded pulse and the pulse from gate 114 (which is in timed coincidence with the previously identified valid distance pulse from register 101) not only produces a valid data strobe signal at output terminal 116, but further provides a signal at terminal 113 of logic 110 to reset the counter thereof. Hence, each coincidence of a decoded pulse from the ground station with one which was being stuffed into the register 101 causes the stuffing to be enabled for three more periods. On the other hand, once the counter of logic 110 reaches its terminal state, if no such reset signal has been received, output terminal 117 drops back to a logical 0 state. A logical 0 state at terminal 117 corresponds to recognition that the pulse which has been stuffed for three preceding periods no longer may be presumed to be a valid data pulse, and therefore the pass-recirculate procedure must be commenced once more.

Figure 2:
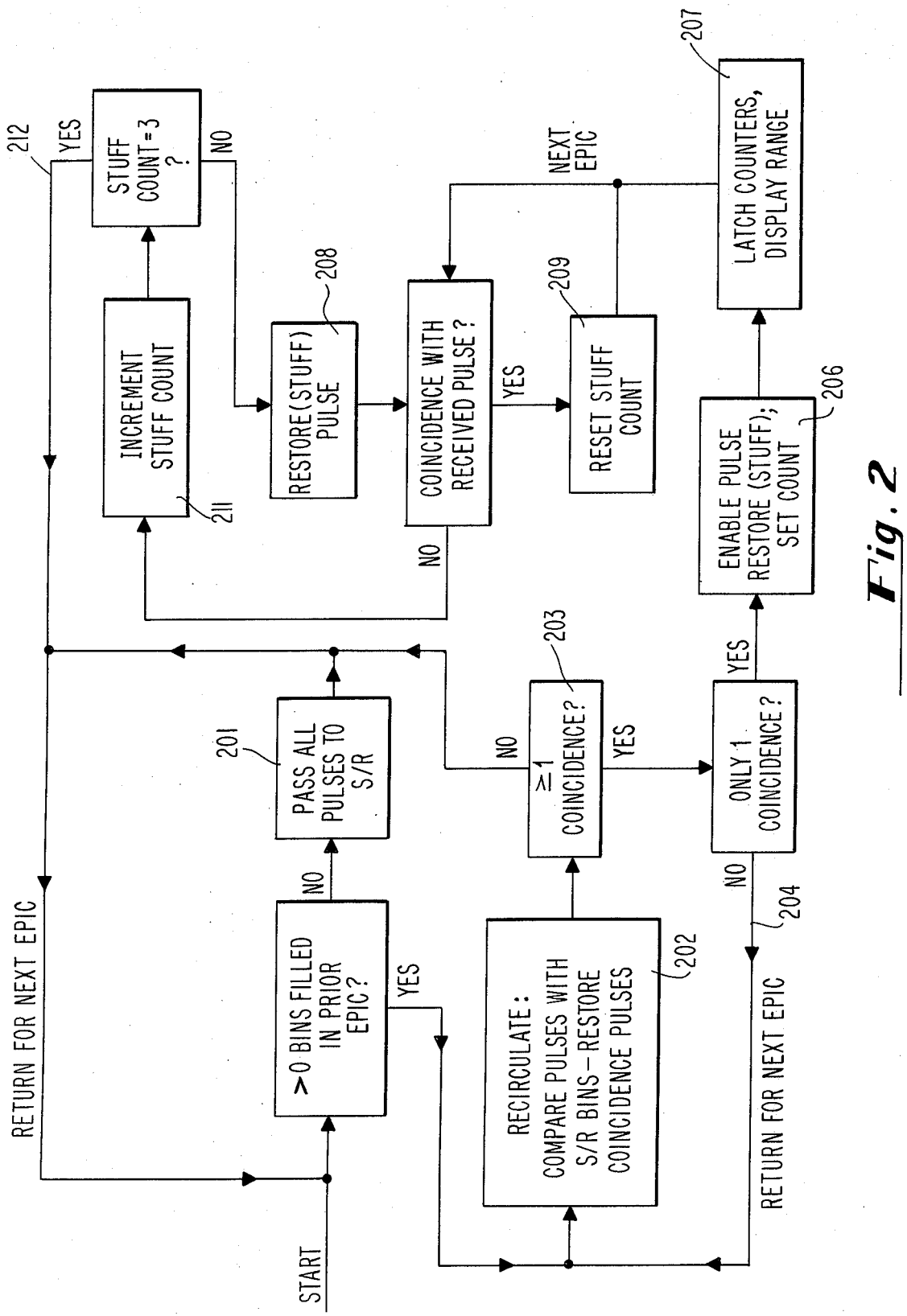
FIG. 2 shows a flow diagram of the logical process performed in accordance with the embodiment of FIG. 1.

The foregoing operation attributed to the embodiment of FIG. 1 is set forth in flow chart fashion in FIG. 2. At the start, if no bins have been filled from the prior epic, the pass mode, indicated at 201, is conducted for an epic, and is repeated as necessary until at least one bin is indicated as having been filled in the prior epic. Then, the recirculate mode as indicated at 202 is conducted. In the recirculate mode, if no coincidences between stored and receive pulses occur, the pass mode must once more be undertaken, and therefore the "no" path from test 203 is followed. If coincidence has occurred, recirculation is conducted via path 204 until only one coincidence occurs. Then, as represented at step 206, the pulse stuffing operation is enabled, and the count is set. Further, identification of one-and-only-one coincidence also corresponds to identification of a valid distance pulse, and the corresponding distance may be computed and displayed, as represented at 207. For the next epic, pulse stuffing will occur, as represented at 208, regardless of receipt of a coincident pulse from the ground station. However, if coincidence occurs, the stuff count is reset, as represented at 209. If not, the stuff count is incremented by 1, as represented at 211, and the process is repeated until pulse stuffing has occurred for three successive epics without receipt of a coincident pulse from the ground station. Under such circumstances, path 212 is followed, and the pass-recirculate process is commenced once more.

In partial summary, the symbolic logic and flow diagrams of FIGS. 1 and 2 set forth improved DME apparatus and methods for the class generally represented by the aforesaid U.S. patent to Bail, whereby a valid distance pulse is automatically regenerated in the memory means for a predetermined number of epics, regardless of receipt or coincident pulses from the ground. However, such coincident receipt will reset the regeneration process.

Figure 3:
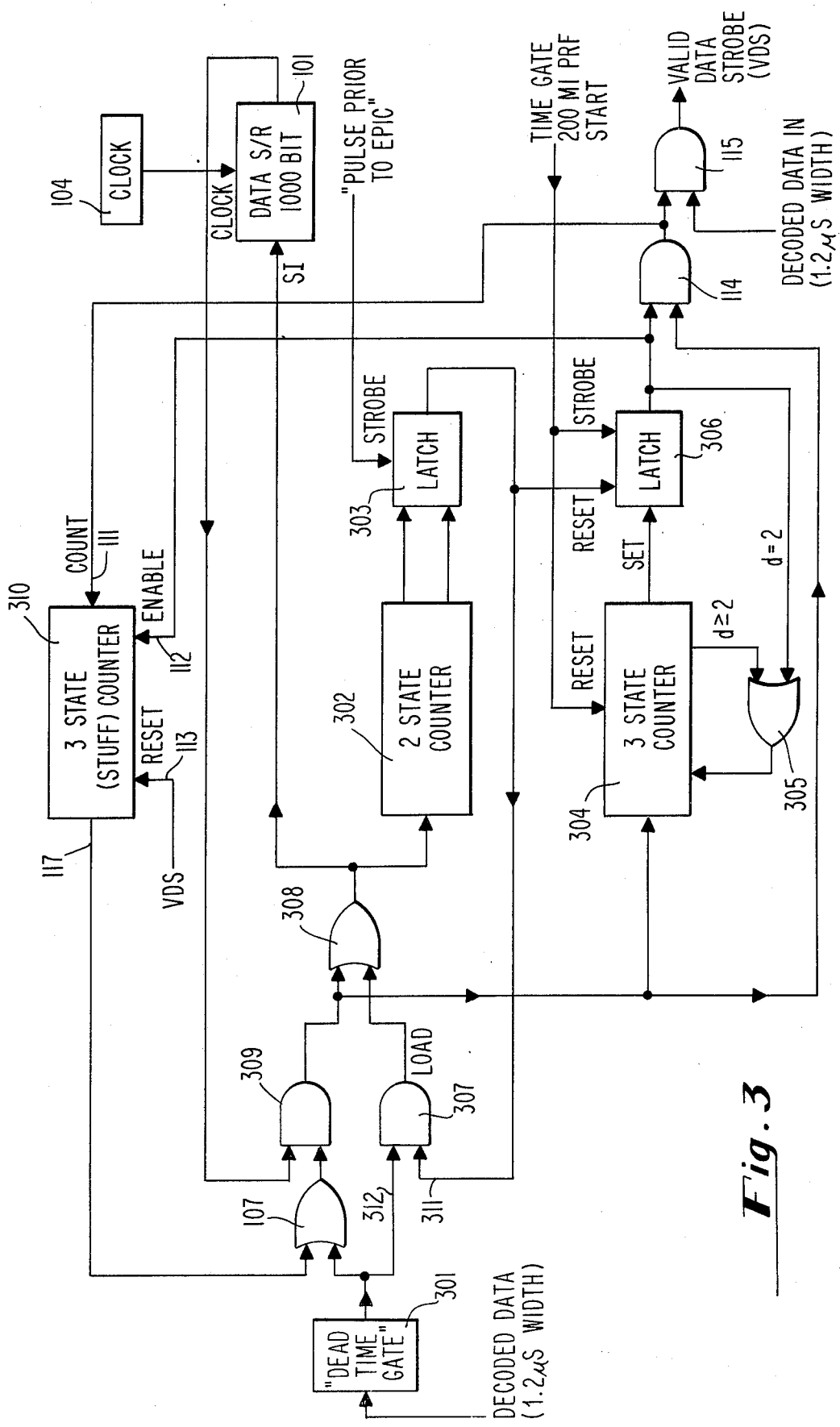
FIG. 3 shows a preferred logic schematic for the embodiment of FIG. 1.

FIG. 3 sets forth a more detailed logic embodiment of the illustrative embodiment of FIG. 1. In FIG. 3, some apparatus is identically constituted to corresponding apparatus of FIG. 1, which numbers therefore are unchanged. Accordingly, a onethousand bit shift register 101 is pulsed from a clock 104. Decoded data is first passed to a dead time gate 301 which functions to eliminate consideration of echo signals. That is, for a predetermined duration, preferably 60 to 100 microseconds, after a decoded signal pulse is received, further received signals may be presumed to be echoes, and may be therefore eliminated from further consideration, because limitations at the ground station make such rapid succession of valid transmitted pulses impossible. From gate 301, the decoded data pulse is coupled to the pass-recirculate logic.

In particular, the pass mode path for all decoded data pulses received during an epic for loading into the register 101 is via and AND gate 307 and an OR gate 308. Utilization of the pass mode is accomplished by energizing input terminal 311 of AND gate 307, whereby pulses coupled at terminal 312 of AND gate 307 are passed through OR gate 308 and directly into the register 101. In turn, the state of terminal 311 is established by a two state counter 302 and a latch 303. The two state counter 302 is responsive to OR gate 308, and therefore is set depending upon whether or not pulses were read into the register 101 during the previous epic. If no pulses were so read in, the counter 302 maintains a first output state, but if any pulses at all were read in, and regardless of the number so read in, the output of counter 302 assumes a different state. The counter 302 primes a latch 303 to operate responsively to a strobe signal from the encoder (not shown herein). That is, if no pulses were read into the register 101 during the prior period, counter 302 primes the latch 303 to energize terminal 311 of gate 307 upon receipt of a strobe signal issued from the encoder just prior to the beginning of each epic. On the other hand, if any pulses were placed in the register during the prior epic, counter 302 causes latch 303 to maintain terminal 311 of gate 307 in a logical 0 state, thereby blocking passage of decoded data signals received at terminal 312 of gate 307. Hence, the pass mode operation is established by counter 302, latch 303, and gate 307.

The recirculate mode path to the register 101 is via OR gate 107, AND gate 309, and OR gate 308. In particular, AND gate 309 is energized only when there is coincidence of an output pulse from register 101 and a logical 1 signal from OR gate 107. As described hereinafter, the OR gate 107 is energized by the three state stuff counter 310 during certain times, but otherwise the decoded data pulses from OR gate 107 afford the time coincidence sampling in the recirculation mode. The recirculation function is controlled by a three state counter 304, a latch 306, AND gate 114, and a feedback OR gate 305. The three state counter 304 assumes an output state depending on whether, and if so, how many pulses were coupled to register 101 through AND gate 309 during the prior epic. If no such pulses were passed, the counter assumes a first output state; if one-and-only-one pulse was passed to register 101 from gate 309, the counter 304 assumes a second state; and if more than one pulse was coupled from gate 309 to register 101 during the prior epic, counter 304 assumes a third state.

In the first case, if no pulse was passed, no logical operations are energized by the three state counter 304, and correspondingly the pass mode is energized as set forth hereinbefore by the two state counter 302. If more than one pulse is coupled in a given epic from gate 309 to register 101, the three state counter inhibits itself via OR gate 305 from energizing the latch 306. However, as set forth hereinbefore, neither will counter 302 energize latch 303 under such circumstances. Accordingly, normal recirculation continues during the next epic.

For the remaining case, when one-and-only-one pulse is conveyed during the prior epic from gate 309 to register 101, the three state counter 304 energizes a latch 306, which thereby conditions the remaining logic to produce a valid data strobe pulse, and also to energize stuffing in accordance with the principles of the present invention. In particular, the latch 306, as well as the three state counter 304 is enabled by an end of epic pulse produced by synchronous timing circuitry (not shown). Hence, assuming one-and-only-one bin of register 101 is filled, the enablement of latch 306 at the end of that epic allows for operation during the next subsequent epics on the basis of that pulse being valid. Accordingly, a three state stuff counter 310 is enabled, thereby energizing terminal 117 to a logical 1 state. As set forth in conjunction with FIG. 1, OR gate 107 is energized, and signals from register 101 are passed back into the register regardless of receipt of coincident decoded data. Latch 306 also conditions AND gate 114; the logical 1 state from latch 306 to gate 114 is sampled during the next epic by the next pulse to be reinstated in register 101 from gate 309. Each time AND gate 114 is so energized, a count pulse is received at count increment terminal 111 of the three state stuff counter 310. Finally, as shown at gate 115, a valid data strobe pulse is produced upon coincidence of a decoded data pulse and a logical 1 pulse from AND gate 114. Further, such production of each valid data strobe is coupled to reset terminal 113 of the three state stuff counter, thereby resetting it for another three stuffing periods.

Parenthetically, it may be noted that the valid data strobe pulse from AND gate 115 generally is coupled directly to reset terminal 113 of the three state stuff counter 310. However, should the aircraft be utilizing an area navigation computer (R-NAV), the pulse from gate 115 may be altered by inserting distance to a phantom station. The pulse then would be coupled to reset terminal 113, as described.

As is evident from the foregoing description, the stuff counter 310 advantageously is embodied simply as a counter which either is disabled, or which, upon receipt of successive counting pulses, increments its count to a terminal count, whereupon it is self disabled. Also, the counter is capable of being reset during any of the counting increments. Simple logic is provided, responsive to the counting states, or producing a specified logical state during selective ones of the counting increments.

As set forth herein, embodiments of the present invention feature pulse stuffing for three successive epics. It is to be understood that the precise number of stuffing epics will vary in accordance with the needs of the designer, and correspondingly the number of counting states of the stuff counter 310 will vary correspondingly.

Embodiments of the present invention have been set forth herein to a level of detail with which those of ordinary skill in the art normally deal. Should an even more detailed rendition be desired, reference may be had to the "Narco Avioncis DME 190 Distance Measuring Equipment Maintenance Manual", which is available from Narco Avionics, a division of Narco Scientific Industries, Fort Washington, Pennsylvania. That maintenance manual is hereby incorporated by reference herein.

Finally, it may be noted that the embodiments set forth herein have been cast rather closely in terms of the apparatus set forth in the aforementioned U.S. pat. No. 3,781,888 to John W. Bail, including the same memory means, timing setup, and the like. It is to be understood that the present invention is not limited merely to those configurations, however, and applications of the principles of the present invention apply to other types of systems. For example, different sorts of timing and memories may be used, as may be different configurations of pass and recirculation logic.

We claim:

1. Digital apparatus for determining distance to a remote station by transmitting signals to the station and by decoding return signals from the remote station, comprising:
    a. memory means for storing signals representative of the relative time relationship of received return signals;
    b. pass-recirculate logic means
        i. for coupling all return signals received during a first epic to said memory means,
        ii. for comparing return signals received during subsequent epics with stored signals from a previous epic in said memory having associated time relationships, and
        iii. for restoring signals in said memory upon coincidence of a received return signal with an associated stored signal; and
    c. logic means for restoring a given stored signal in said memory means for a predetermined number of epics, irrespective of receipt of return signals from said ground station; and
    d. means for identifying when only one signal is stored in said memory means, and deriving said distance therefrom.

2. Apparatus as described in claim 1 wherein said logic means for regenerating comprises means for identifying when only one signal is stored in said memory means at the end of a given epic, and for thereupon energizing said regenerating function commencing for said predetermined number of next subsequent epics.

3. Apparatus as described in claim 2 wherein said means for identifying and energizing includes means for terminating said regenerating function upon completion of three next subsequent epics.

4. Apparatus as described in claim 2 wherein said pass-recirculate logic means for comparing includes counting means for determining the number of coincidences, during a given epic, of stored and associated received signals, and wherein said logic means for regenerating is enabled by a one-and-only-one coincidence determination by said counting means.

5. Apparatus as described in claim 2 wherein said means for identifying and energizing includes means for energizing said pass-recirculate means for coupling during the epic next subsequent to each epic in which no signals are restored to said memory means.

6. In a digital DME transceiver having a memory and pass-recirculate logic for determining distance to a remote station by elimination of signals received during prior epics, elimination being based on failure to receive a corresponding signal during a present epic, an improvement for compensating for failure of said remote station to respond, comprising:
    logic means for inhibiting said elimination process for a predetermined number of subsequent epics after said distance is determined during a given epic; and
    means for maintaining a representation of the determined distance in said memory for said predetermined number of subsequent epics.

7. Apparatus as described in claim 6 wherein said logic means includes means for inhibiting said elimination process for three said subsequent epics.

8. In a DME aircraft transceiver, a method of determining the distance of the aircraft from a ground station from which signals are returned, comprising the steps of:
    a. during a first epic, storing all received signals in timed relationship to the time of signal transmission from the aircraft;
    b. during successive subsequent epics, storing in time relationship with said signal transmission only received signals which are in time coincidence with signals stored during the prior epic;
    c. identifying when only one such coincidence signal is stored during an epic;
    d. automatically restoring said one signal for a predetermined number of next subsequent epics, irrespective of received signals during said next subsequent epics; and
    e. deriving the aircraft distance from the remote station from said one signal.

9. A method as described in claim 8 wherein said first named storing step is re-executed after said next subsequent epic.

10. A method as described in claim 8 wherein said restoring step includes automatically restoring said one signal for three of said next subsequent epics.

* * * * *